United States Patent
Keeven

(10) Patent No.: US 6,631,800 B1
(45) Date of Patent: Oct. 14, 2003

(54) DISPENSER FOR FIBERS

(76) Inventor: Martin G. Keeven, 2838 Salena, St. Louis, MO (US) 63118

( * ) Notice: Subject to any disclaimer, the term of this patent is extended or adjusted under 35 U.S.C. 154(b) by 19 days.

(21) Appl. No.: 09/877,983

(22) Filed: Jun. 8, 2001

Related U.S. Application Data

(60) Provisional application No. 60/210,639, filed on Jun. 9, 2000.

(51) Int. Cl.$^7$ ............................ A45C 11/00; B65D 85/00
(52) U.S. Cl. .................... 206/37; 206/315.11; 206/270; 206/579; 222/519; 222/548; 215/223
(58) Field of Search ........................ 206/37, 37.1, 38, 206/38.1, 538, 539, 540, 536, 535, 270, 579, 315.1, 315.11, 303, 815; 220/253, 8; 215/223; 222/519, 524, 549, 548; 221/154

(56) References Cited

U.S. PATENT DOCUMENTS

| | | | |
|---|---|---|---|
| 183,555 A | * 10/1876 | Frazer | 206/38 |
| 447,663 A | * 3/1891 | Carpenter | 206/234 |
| 450,312 A | * 4/1891 | Hieatzman | 131/256 |
| 827,539 A | * 7/1906 | Kohlmeyer | 206/214 |
| 1,137,642 A | * 4/1915 | Lingner | 206/121 |
| 1,216,031 A | * 2/1917 | Wilcox | 206/270 |
| 1,342,512 A | * 6/1920 | Skinderviken | 206/270 |
| 1,506,273 A | * 8/1924 | Smith | 19/159 R |
| 3,112,645 A | 12/1963 | Glass | 73/170.04 |
| 3,658,719 A | 4/1972 | McConnaughey | 73/170.04 |
| 4,423,626 A | 1/1984 | Herschede | 73/188 |
| 4,971,203 A | * 11/1990 | Weinstein | 206/536 |
| 5,011,009 A | * 4/1991 | Scheurer | 206/270 |
| 5,186,118 A | 2/1993 | Stinson | 116/214 |
| 5,289,915 A | 3/1994 | Queen | 206/38 |
| 5,291,778 A | 3/1994 | Dexheimer et al. | 73/170.05 |
| 5,318,177 A | * 6/1994 | Isacson | 206/38.1 |
| 5,579,933 A | * 12/1996 | Hofmann | 206/536 |
| 5,769,212 A | 6/1998 | Collins | 206/38 |
| 5,958,585 A | 9/1999 | Meeks | 428/392 |

* cited by examiner

*Primary Examiner*—J. Mohandesi
(74) *Attorney, Agent, or Firm*—Grace J. Fishel

(57) ABSTRACT

A dispenser for fibers for use by a sportsman and adapted to be attached to an article of clothing or gear worn by the sportsman. The dispenser is a capsule with a body and a cap with apertures that can be aligned. When the apertures are aligned, fibers can be reached and pulled out of the dispenser in wisps for use by the sportsman.

8 Claims, 4 Drawing Sheets

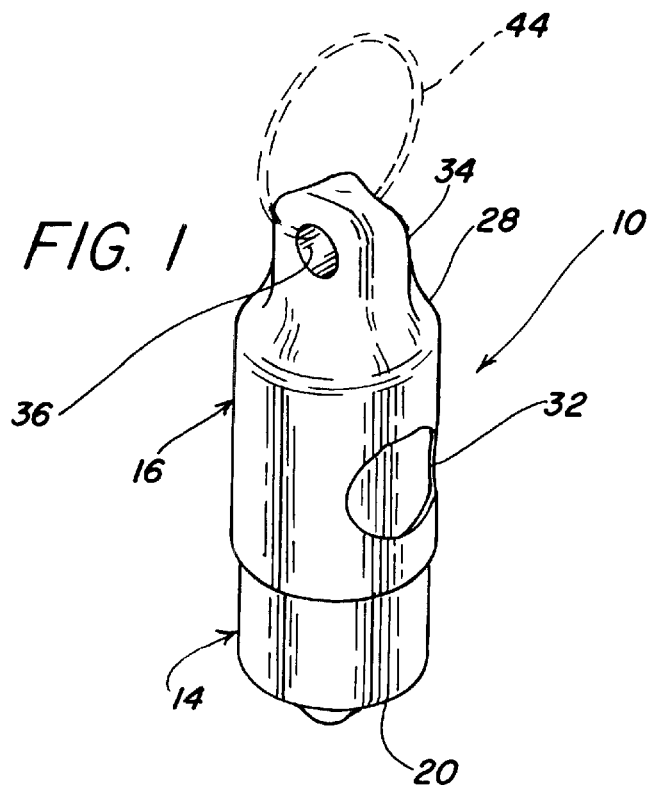
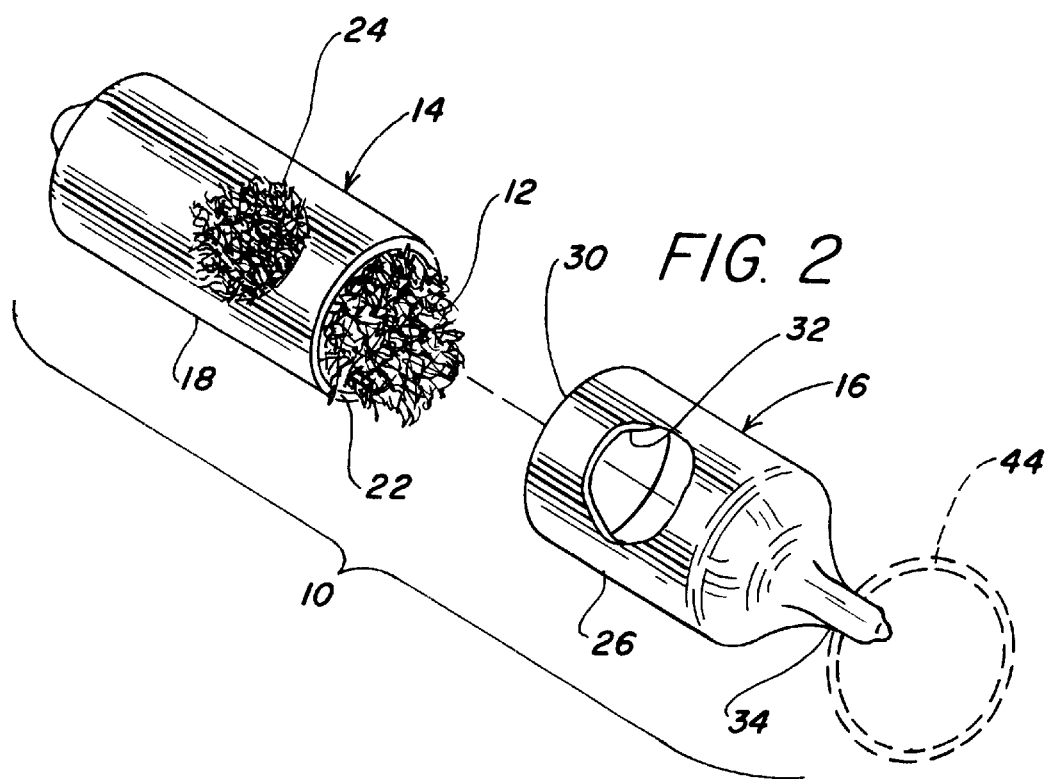

DISPENSER FOR FIBERS

This application claims the benefit of U.S. provisional patent application serial No. 60/210,639, filed Jun. 9, 2000.

BACKGROUND OF THE INVENTION

1. Field of the Invention

The present invention relates to a dispenser for fibers for use by sportsmen.

2. Brief Description of the Prior Art

The direction and speed of the wind is important to golfers in planning a shot and to hunters in positioning themselves, since game downwind from a hunter will avoid the hunter's position if they detect the hunter's scent. For bow hunters, windage also has a significant affect on the trajectory of an arrow.

Many different techniques have been used to determine the direction and speed of the wind, each of which, however, has certain shortcomings. For example, a golfer or hunter can throw a handful of grass or dirt into the air to determine wind direction and speed but the sudden movement of the hunter may be detected by the animal. There are chemical smoke dispensers and dispensers for emitting a cloud of talc. The animal may be spooked by the chemical odor of the smoke and particles of talc may not travel far enough for the hunter to gauge wind speed.

Another technique for determining the direction and speed of the wind is a length of yarn tied to the barrel of a gun or handle of a bow. Since wind currents immediately adjacent the hunter may be misleading, a few fibers can be torn loose from the length and set adrift to check the direction and speed of the wind in a larger area surrounding the hunter. A variation on this makes use of milkweed fibers.

The dispensers for talc and milkweed fibers require a user to pull them out of a pocket and open up the top before the product can squirted or the milkweed set adrift on the wind. That can take two hands and use up precious seconds when an animal is close.

BRIEF SUMMARY OF THE INVENTION

In view of the above, it is an object of the present invention to provide a dispenser for fibers that can be openly carried on the sportsman's person. It is another object to provide a dispenser for fibers that is compact and simple to make and operate. Other objects and features of the invention will be in part apparent and in part pointed out hereinafter.

In accordance with the invention, a dispenser for fibers adapted to be attached to an article worn by a sportsman is a capsule with a body and a cap. The body has an annular elongated wall of circular cross-section with at least one aperture, a closed bottom and an open top. The cap has an annular elongated wall of circular cross-section with an aperture, closed top and an open bottom.

The cap has a diameter slightly larger than the diameter of the body and the open bottom of the cap fits snugly over the open top of the body and permits the cap to be rotated on the body such that the aperture in the body can be aligned with the aperture in the cap. With the apertures aligned, fibers placed in the body can be reached through the aligned apertures and pulled out in wisps for use by a sportsman.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which one of various possible embodiments of the invention is illustrated, corresponding reference characters refer to corresponding parts throughout the several views of the drawings in which:

FIG. 1 is a perspective view of a dispenser for fibers for use by a sportsman in accordance with the present invention;

FIG. 2 is a perspective exploded view of the dispenser showing the interior of the dispenser containing a bundle of fiber;

DETAILED DESCRIPTION OF THE INVENTION

Figure 3:
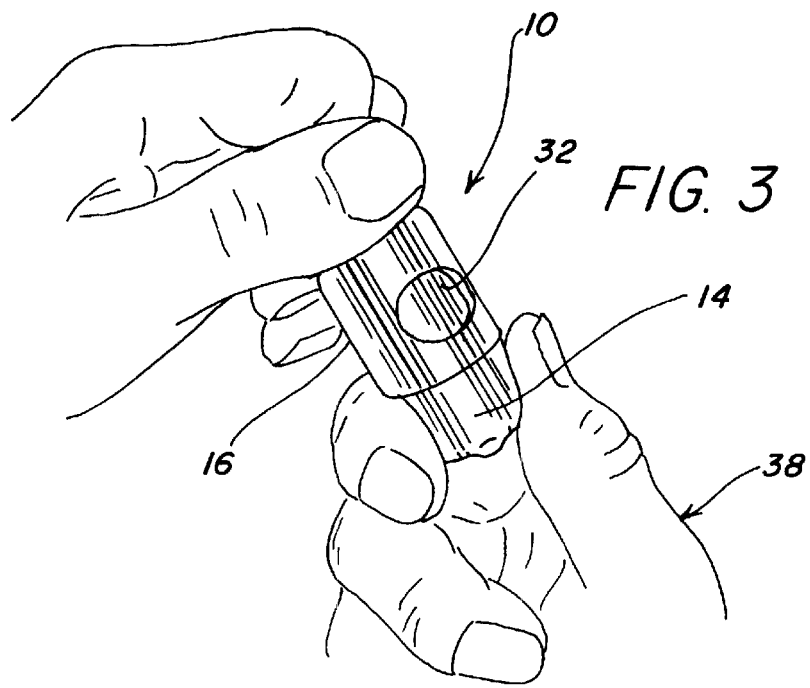
FIG. 3 is perspective view of the dispenser displaying the dispenser closed in use by a sportsman.
Figure 4:
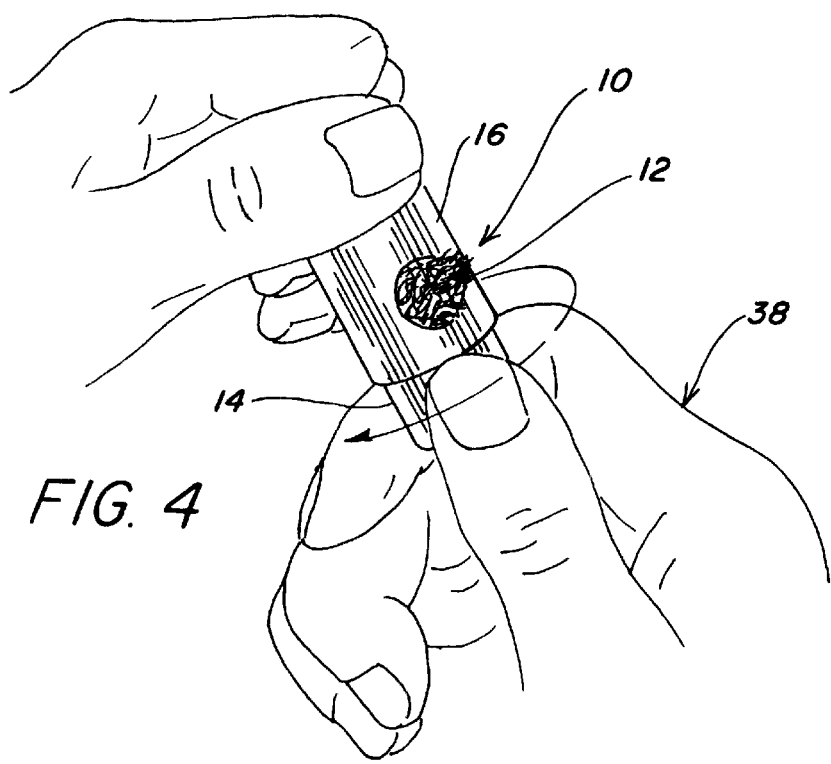
FIG. 4 is a perspective of the dispenser being opened by the sportsman to expose the fibers.
Figure 5:
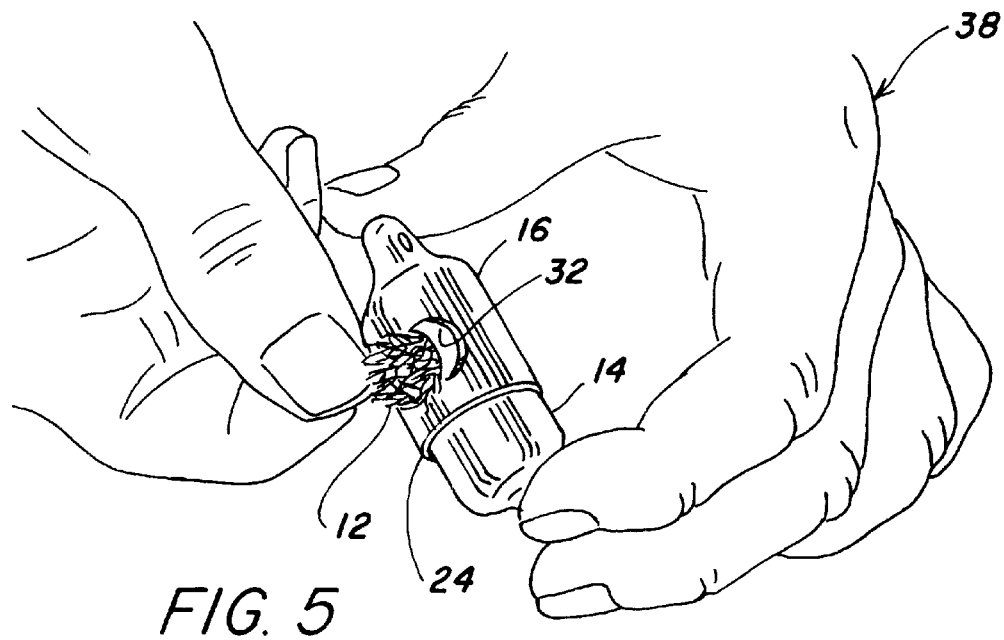
FIG. 5 is a perspective view of the dispenser showing the sportsman pulling a portion of the bundle of cotton from the dispenser from which a small wisp may be torn.

Referring to the drawings more particularly by reference character, reference numeral 10 refers to a dispenser for fibers in accordance with the present invention adapted to be attached to an article worn by a sportsman. Dispenser 10 comprises a capsule adapted to contain fibers 12 and having a body 14 and a cap 16. Body 14 and cap 16 are preferably formed of a somewhat flexible plastic material although other substances, both flexible and inflexible may be used.

Body 14 has an annular elongated wall 18 of circular cross-section with a closed bottom 20, illustrated as rounded, and an open top 22. Annular wall 18 has an aperture 24. In the drawings, aperture 24 is round in cross-section, although it may have other shapes such as rectangular, triangular, etc. Circular, or rounded cross-sections such as oval, however, are preferred.

Cap 16 has an annular elongated wall 26 of circular cross-section with a closed top 28 and an open bottom 30. Annular wall 26 has an aperture 32 and, as shown, closed top 28 is rounded. Aperture 32 like the aperture 24 is round in cross-section, although it may have other shapes. Closed top 28 is surmounted with a boss 34 having an eyelet 36. Eyelet 36 may be used to attach dispenser 10 to a golfer's bag or hunter's person.

Figure 6:
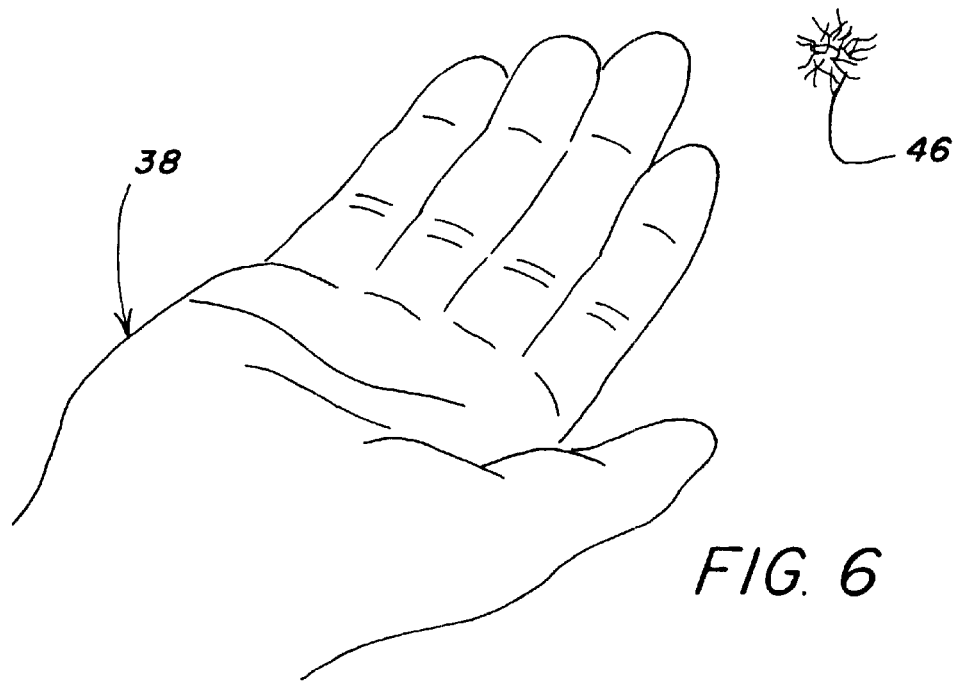
FIG. 6 is a perspective view of the sportsman setting the wisp of cotton adrift on a wind current.

Cap 26 has a diameter slightly larger than the diameter of body 24 and is proportioned so that open bottom of cap 30 fits snugly over open top 22 of body 14. When cap 16 is rotated with respect to body 14, aperture 32 in cap 16 can be aligned with aperture 24 in body 14, at which point as shown in FIG. 6, a sportsman 38 can reach fibers 12 placed in body 14 through the aligned apertures.

Figure 7:
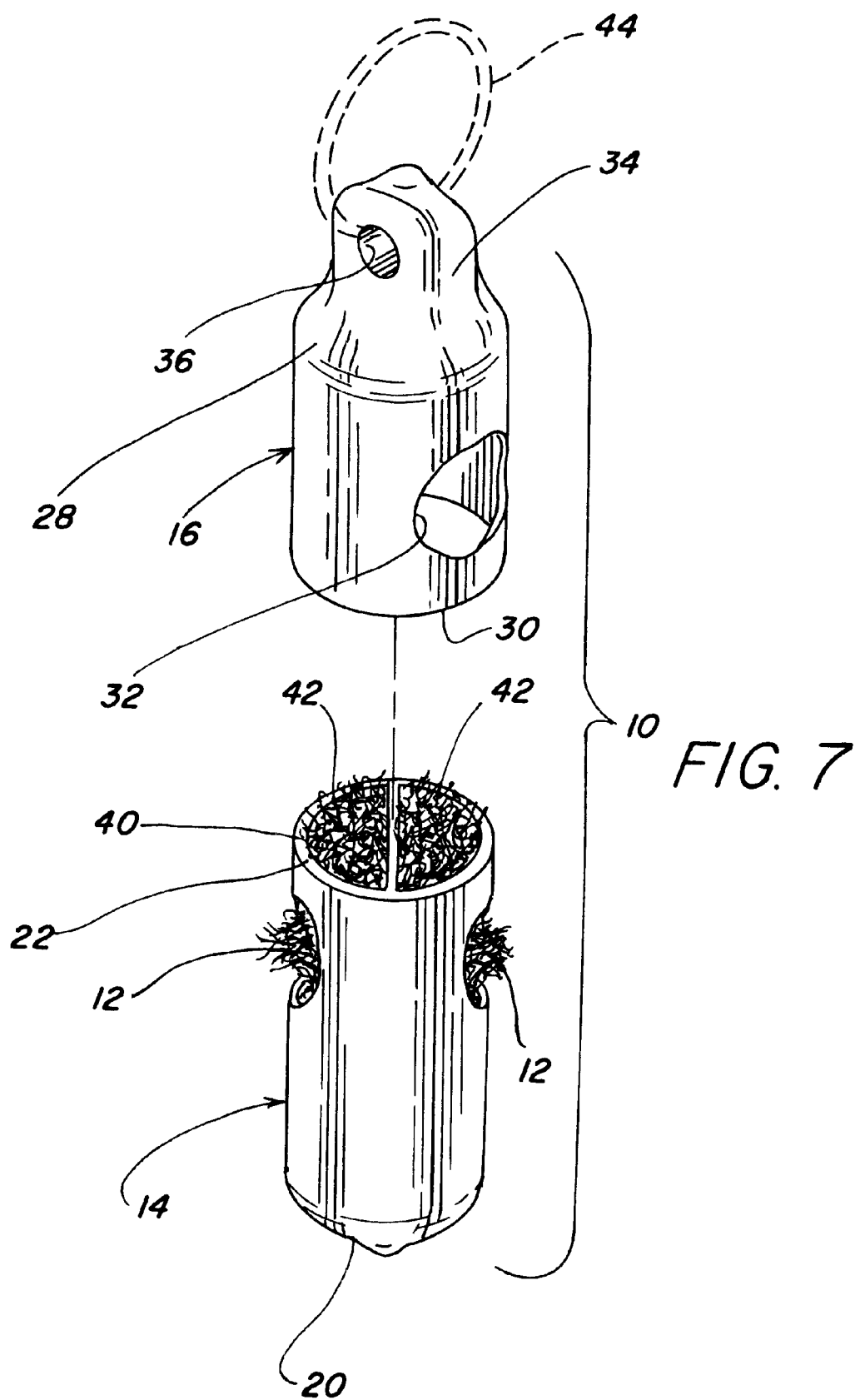
FIG. 7 is a perspective exploded view of the dispenser illustrated with a wall dividing the interior into two compartments for use with fibers of different colors.

Fibers 12 may be natural white or treated with a high visibility dye such as high-visibility orange. Other fluorescent colors that will provide high visibility to the fibers may also be used. Bright white fibers are good for dark woods and high-visibility orange are particularly good for snow. Dispenser 10, as shown in FIG. 7, may be modified such that it contains both natural white fibers and fibers dyed with a high-visibility color. With continuing reference to FIG. 7, a wall 40 is provided for dividing an interior of body 14 into one or more compartments 42. An aperture 24 is provided in annular elongated wall 18 in communication with each compartment 42 through which different colored fibers 12 may be selectively pulled when aligned with aperture 32 in cap 16.

It is preferred that apertures 24, 32 be circular as there is less resistance when cap 16 is rotated on body 14 than with shapes with corners. Boss 34 is shown in the drawings as a rectangular tab. Boss 34, however, may be decorative, taking, for example the shape of a feather, divot, dandelion puff, other non-circular geometric shapes such as triangular, etc. The particular form shown in the drawings is preferred because body 24 and cap 26 are commercially available, sold separately and without apertures 24, 32 for other purposes.

If desired, sportsman 38 may add a favorite attractant or cover scent to fibers 12. For this, cap 16 is removed from body 14 and fibers 12 removed from body 14. Fibers 12 are then carefully spread out and sprayed with an attractant or cover scent. After fibers 12 are sufficiently dry, they are returned to body 14 and cap 16 is reinstalled.

In use, sportsman 38 attaches dispenser 10 by eyelet 36 to his or her clothing or gear having an available, easy-to-reach ring or loop, zipper tab, button, etc. by an attachment means 44, shown in broken lines in FIGS. 1–2, such as a snap ring, split ring, string tie, chain or the like. Using two hands, cap 16 is twisted on body 18 until apertures 24, 32 are aligned. A stand of fibers 12 is pinched out about one-half inch long and cap 16 is then twisted back until dispenser 10 is almost closed for easy one-handed access. With the bundle of fibers sticking out of dispenser 10, wisps 46 of fibers 12 can be easily plucked from the bundle of fibers with one hand, while the sportsman's other hand continues to hold his or her archery bow, gun, golf club, etc. Wisp 46 is then let loose on the breeze as shown in FIG. 6. Unlike talc, wisps 46 can be seen up to 50 yards downwind confirming wind direction and speed.

Proper use and understanding of wind currents is a key factor that separates hunters who consistently bag game from those who merely rely on luck for success. Dispenser 10 allows a sportsman to continually monitor wind direction and currents in order to avoid alarming the prey, whose primary defense is their sense of smell. Wisps 46 can be set loose in the air with minimal movement by the hunter and without putting his or her weapon down. For bow and black powder hunters, stealth is particularly critical in hunting deer.

Dispenser 10 may be used by other sportsmen including golfers and fishermen. For example, wisp 46 may be torn from the bundle of fibers by a fly fisherman and wrapped about the junction between a fly line and a leader for use as a strike indicator. At the end of a fishing session when the line is reeled in, the little wad of fiber may be removed such that it does not catch on the guides of the fishing pole. Other applications will occur to sportsmen.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A dispenser for cotton fibers for use by a sportsman, said dispenser comprising a capsule with a body and a cap, said body having an annular elongated wall of circular cross-section, a closed bottom and an open top, said annular wall having at least one aperture and a smooth exterior surface, said cap having an annular elongated wall of circular cross-section with a closed top with means for carrying the dispenser on a sportsman's person and an open bottom, said annular wall having an aperture and a smooth interior surface, said cap having a diameter slightly larger than the diameter of the body, said open bottom of the cap fitting snugly over the open top of the body and permitting the cap to be rotated on the body with the smooth exterior surface of the body in substantially continuous surface-to-surface contact and in rotating relationship without any obstruction with the smooth interior surface of the cap, such that the aperture in the body can be selectively aligned with the aperture in the cap, wherein said body contains a bundle of cotton fibers, whereby the cotton fibers are reached by aligning the apertures and pulling out wisps of cotton fibers through the apertures.

2. The dispenser of claim 1 wherein the means for carrying the dispenser on a sportsman's person is an attachment eyelet formed in a boss that projects from the cap.

3. The dispenser of claim 1 wherein the cotton fibers are natural white or are treated with a high visibility dye.

4. A dispenser for cotton fibers adapted to be attached to an article worn by a sportsman, said dispenser comprising a capsule with a flexible plastic body and a cap, said body having an annular elongated wall of circular cross-section with a closed bottom and an open top, said annular wall having an aperture and a smooth exterior surface, said cap having an annular elongated wall of circular cross-section with a closed top with means for carrying the dispenser on a sportsman's person and an open bottom, said annular wall having an aperture and a smooth interior surface, said cap having a diameter slightly larger than the diameter of the body, said open bottom of the cap fitting snugly over the open top of the body with the smooth exterior surface of the body in substantially continuous surface-to-surface contact and in rotating relationship without any obstruction with the smooth interior surface of the cap and permitting the cap to be rotated on the body, such that the aperture in the body can be selectively aligned with the aperture in the cap, wherein said body contains a bundle of cotton fibers, whereby the cotton fibers are reached by aligning the apertures and pulling out wisps of cotton fibers through the apertures.

5. The dispenser of claim 4 wherein the means for carrying the dispenser on a sportsman's person is an attachment eyelet formed in a boss that projects from the cap.

6. The dispenser of claim 5 wherein the cotton fibers are natural white or are treated with a high visibility dye.

7. A dispenser for cotton fibers adapted to be attached to an article worn by a sportsman, said dispenser comprising a capsule with a flexible plastic body and a cap, said body having an annular elongated wall of circular cross-section, a closed bottom, an open top and a wall dividing an interior of the body into at least two compartments, said annular wall having an aperture communicating with each compartment and a smooth exterior surface, said cap having an annular elongated wall of circular cross-section with a closed top with means for carrying the dispenser on a sportsman's person and an open bottom, said annular wall having an aperture and a smooth interior surface, said cap having a diameter slightly larger than the diameter of the body, said open bottom of the cap fitting snugly over the open top of the body and permitting the cap to be rotated on the body with the smooth exterior surface of the body in substantially continuous surface-to-surface contact and in rotating relationship without any obstruction, such that each of the apertures in the body can be selectively aligned with the aperture in the cap, wherein said body contains a bundle of cotton fibers, whereby the cotton fibers are reached by aligning the apertures and pulling out wisps of cotton fibers through the apertures.

8. The dispenser of claim 7 having two compartments, a first of which contains a natural white cotton bundle of fibers and a second of which contains a bundle of cotton fibers dyed orange.

* * * * *